United States Patent
Sprague et al.

(10) Patent No.: US 9,140,952 B2
(45) Date of Patent: Sep. 22, 2015

(54) ELECTROPHORETIC DISPLAY WITH ENHANCED CONTRAST

(75) Inventors: Robert A. Sprague, Saratoga, CA (US); Craig Lin, San Jose, CA (US)

(73) Assignee: E Ink California, LLC, Fremont, CA (US)

(*) Notice: Subject to any disclaimer, the term of this patent is extended or adjusted under 35 U.S.C. 154(b) by 197 days.

(21) Appl. No.: 13/092,052

(22) Filed: Apr. 21, 2011

(65) Prior Publication Data

US 2011/0261433 A1 Oct. 27, 2011

Related U.S. Application Data

(60) Provisional application No. 61/326,936, filed on Apr. 22, 2010.

(51) Int. Cl.
*G02B 26/00* (2006.01)
*G02F 1/167* (2006.01)

(52) U.S. Cl.
CPC ........ *G02F 1/167* (2013.01); *G02F 2001/1672* (2013.01)

(58) Field of Classification Search
CPC .................. G02F 1/167; G02F 2001/1672
USPC ............... 359/290–296; 345/107–108
See application file for complete search history.

(56) References Cited

U.S. PATENT DOCUMENTS

| | | |
|---|---|---|
| 3,756,693 A | 9/1973 | Ota |
| 3,892,568 A | 7/1975 | Ota |
| 4,298,448 A | 11/1981 | Muller et al. |
| 5,378,574 A | 1/1995 | Winnik et al. |
| 5,980,719 A | 11/1999 | Cherukuri et al. |
| 6,198,809 B1 | 3/2001 | Disanto et al. |
| 6,337,761 B1 | 1/2002 | Rogers et al. |
| 6,373,461 B1 | 4/2002 | Hasegawa et al. |
| 6,486,866 B1 | 11/2002 | Kuwahara et al. |
| 6,538,801 B2 | 3/2003 | Jacobson et al. |
| 6,600,534 B1 * | 7/2003 | Tanaka et al. ............. 349/113 |
| 6,650,462 B2 | 11/2003 | Katase |

(Continued)

FOREIGN PATENT DOCUMENTS

| CN | 1617033 | 5/2005 |
|---|---|---|
| EP | 1 089 118 | 4/2001 |

(Continued)

OTHER PUBLICATIONS

U.S. Appl. No. 13/038,255, filed Mar. 1, 2011, Sprague.

(Continued)

*Primary Examiner* — Thomas K Pham
*Assistant Examiner* — Vipin Patel
(74) *Attorney, Agent, or Firm* — Perkins Coie LLP

(57) ABSTRACT

The present invention is directed to an electrophoretic display with enhanced contrast. The invention is directed to an electrophoretic display comprising: a first layer comprising a common electrode, a second layer comprising at least one collecting pixel electrode, a plurality of display cells which are sandwiched between the first layer and the second layer and are filled with an electrophoretic fluid comprising charged pigment particles dispersed in a solvent or solvent mixture; and a background layer. More specifically, the invention provides an electrophoretic display having the dark color state darker while maintaining the same intensity of the lighter color state.

8 Claims, 6 Drawing Sheets

(56) References Cited

U.S. PATENT DOCUMENTS

| | | |
|---|---|---|
| 6,693,620 B1 | 2/2004 | Herb et al. |
| 6,704,133 B2 | 3/2004 | Gates et al. |
| 6,724,521 B2 | 4/2004 | Nakao et al. |
| 6,729,718 B2 | 5/2004 | Goto et al. |
| 6,751,007 B2 | 6/2004 | Liang et al. |
| 6,829,078 B2 | 12/2004 | Liang et al. |
| 6,864,875 B2 | 3/2005 | Drzaic et al. |
| 7,009,756 B2 | 3/2006 | Kishi et al. |
| 7,038,655 B2 | 5/2006 | Herb et al. |
| 7,038,670 B2 | 5/2006 | Liang et al. |
| 7,046,228 B2 | 5/2006 | Liang et al. |
| 7,050,218 B2 | 5/2006 | Kanbe |
| 7,075,502 B1 | 7/2006 | Drzaic et al. |
| 7,226,550 B2 | 6/2007 | Hou et al. |
| 7,271,947 B2 | 9/2007 | Liang et al. |
| 7,283,199 B2 | 10/2007 | Aichi et al. |
| 7,303,818 B2 * | 12/2007 | Minami ............... 428/402 |
| 7,342,556 B2 | 3/2008 | Oue et al. |
| 7,365,732 B2 | 4/2008 | Matsuda et al. |
| 7,382,351 B2 * | 6/2008 | Kishi ............... 345/107 |
| 7,411,719 B2 | 8/2008 | Paolini et al. |
| 7,417,787 B2 | 8/2008 | Chopra et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,760,419 B2 | 7/2010 | Lee |
| 7,830,592 B1 | 11/2010 | Sprague et al. |
| 7,852,548 B2 | 12/2010 | Roh |
| 7,982,941 B2 | 7/2011 | Lin et al. |
| 8,072,675 B2 | 12/2011 | Lin et al. |
| 8,089,686 B2 * | 1/2012 | Addington et al. .......... 359/296 |
| 8,115,729 B2 | 2/2012 | Danner et al. |
| 8,120,838 B2 | 2/2012 | Lin et al. |
| 8,159,636 B2 * | 4/2012 | Sun et al. ............. 349/106 |
| 8,169,690 B2 | 5/2012 | Lin et al. |
| 8,237,892 B1 | 8/2012 | Sprague et al. |
| 8,395,836 B2 | 3/2013 | Lin et al. |
| 2002/0033792 A1 | 3/2002 | Inoue |
| 2002/0145792 A1 * | 10/2002 | Jacobson et al. ............. 359/296 |
| 2002/0171620 A1 | 11/2002 | Gordon et al. |
| 2003/0002132 A1 | 1/2003 | Foucher et al. |
| 2003/0095094 A1 | 5/2003 | Goden |
| 2003/0107631 A1 | 6/2003 | Goto et al. |
| 2003/0132908 A1 | 7/2003 | Herb et al. |
| 2004/0051935 A1 | 3/2004 | Katase |
| 2004/0113884 A1 | 6/2004 | Albert et al. |
| 2004/0136048 A1 | 7/2004 | Arango et al. |
| 2004/0184137 A1 * | 9/2004 | Kaneko et al. ............... 359/296 |
| 2004/0190115 A1 | 9/2004 | Liang et al. |
| 2004/0252361 A1 | 12/2004 | Machida et al. |
| 2004/0263947 A1 | 12/2004 | Drzaic et al. |
| 2005/0105161 A1 * | 5/2005 | Nakai et al. ................... 359/296 |
| 2005/0151709 A1 | 7/2005 | Jacobson et al. |
| 2005/0190431 A1 | 9/2005 | Matsuda |
| 2006/0197738 A1 | 9/2006 | Kawai |
| 2006/0245060 A1 | 11/2006 | Goto |
| 2007/0002008 A1 | 1/2007 | Tam |
| 2007/0080928 A1 | 4/2007 | Ishii et al. |
| 2007/0263277 A1 * | 11/2007 | Liang et al. ............ 359/296 |
| 2007/0268556 A1 | 11/2007 | Chopra et al. |
| 2007/0273637 A1 | 11/2007 | Zhou et al. |
| 2008/0042928 A1 | 2/2008 | Schlangen et al. |
| 2008/0174531 A1 | 7/2008 | Sah |
| 2008/0174851 A1 * | 7/2008 | Kawai et al. ............ 359/296 |
| 2009/0034054 A1 | 2/2009 | Ikegami et al. |
| 2009/0161200 A1 * | 6/2009 | Jang et al. ................. 359/296 |
| 2009/0213452 A1 | 8/2009 | Lin et al. |
| 2009/0251763 A1 | 10/2009 | Sprague et al. |
| 2009/0273827 A1 | 11/2009 | Lin et al. |
| 2010/0053728 A1 * | 3/2010 | Lin et al. ............. 359/296 |
| 2010/0103502 A1 | 4/2010 | Jacobson et al. |
| 2010/0165005 A1 | 7/2010 | Sprague |
| 2010/0165448 A1 | 7/2010 | Sprague |
| 2011/0102313 A1 | 5/2011 | Hsieh et al. |
| 2011/0217639 A1 | 9/2011 | Sprague |
| 2011/0261433 A1 | 10/2011 | Sprague et al. |
| 2011/0292094 A1 | 12/2011 | Lin |
| 2012/0007897 A1 | 1/2012 | Yang et al. |
| 2012/0307346 A1 | 12/2012 | Sprague |

FOREIGN PATENT DOCUMENTS

| | | |
|---|---|---|
| JP | 2004-20818 | 6/2002 |
| JP | 2008-03335 | 2/2008 |
| WO | WO 99/53373 | 10/1999 |
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/092,052, filed Apr. 21, 2011, Sprague et al.
U.S. Appl. No. 13/225,184, filed Sep. 2, 2011, Wang et al.
U.S. Appl. No. 13/370,186, filed Feb. 9, 2012, Wang et al.
U.S. Appl. No. 13/371,293, filed Feb. 10, 2012, Zhang et al.
U.S. Appl. No. 13/551,541, filed Jul. 17, 2012, Yang et al.
U.S. Appl. No. 13/633,788, filed Oct. 2, 2012, Wang et al.

* cited by examiner

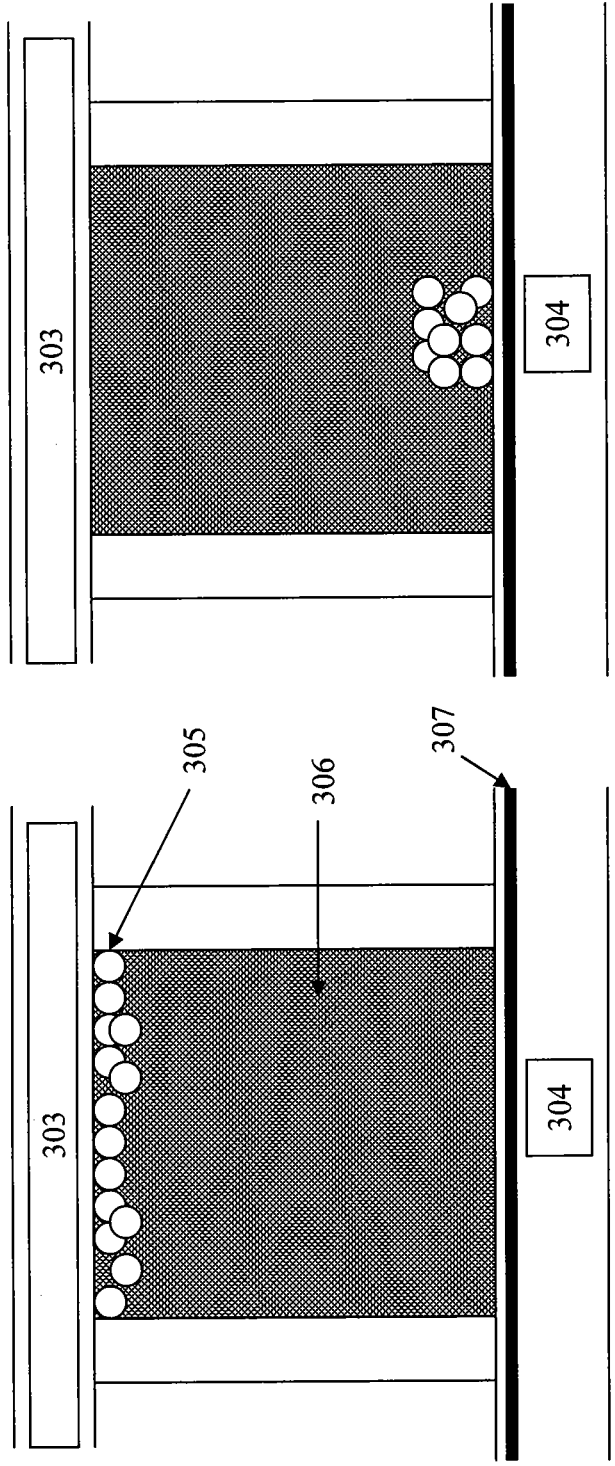

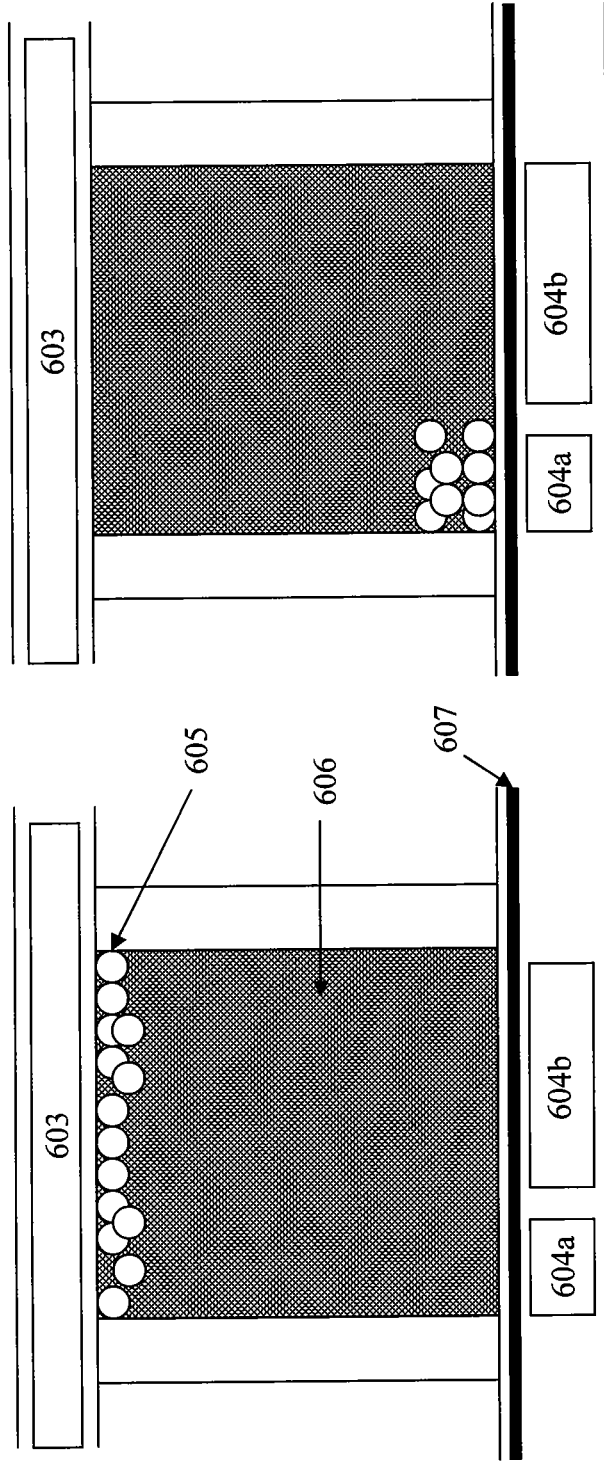

ELECTROPHORETIC DISPLAY WITH ENHANCED CONTRAST

This application claims the benefit of U.S. Provisional Application No. 61/326,936, filed Apr. 22, 2010, which is incorporated herein by reference in its entirety.

FIELD OF THE INVENTION

The present invention is directed to an electrophoretic display with enhanced contrast.

BACKGROUND OF THE INVENTION

An electrophoretic display (EPD) is a non-emissive device based on the electrophoresis phenomenon influencing charged pigment particles suspended in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

When a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate back to the opposite plate, thereby reversing the color.

An electrophoretic display as described has certain disadvantages. For example, in the dark color state while the light-colored pigment particles are at the bottom of a display cell (opposite from the viewing side), the dark-colored dye in the display fluid cannot absorb all of the incoming light. As a result, some of the incoming light would penetrate through the dark-color fluid and strike the light-colored pigment particles and then reflect back to the viewer. This will increase the reflectance of the dark state and lower the contrast of the images displayed.

SUMMARY OF THE INVENTION

The first aspect of the invention is directed to an electrophoretic display, which comprises
(a) a first layer comprising a common electrode;
(b) a second layer comprising at least one collecting pixel electrode;
(c) a plurality of display cells which are sandwiched between the first layer and the second layer and are filled with an electrophoretic fluid comprising charged pigment particles dispersed in a solvent or solvent mixture; and
(d) a background layer which has the same color as the solvent or solvent mixture.

In this first aspect of the invention, in one embodiment, the second layer has one collecting pixel electrode. In one embodiment, the second layer has more than one collecting pixel electrode and they are electrically connected. In one embodiment, the percentage of the total collecting pixel electrode area in the area of the second layer is less than about 95%, preferably less than about 75%, more preferably less than about 50%, and most preferably less than about 30%. In one embodiment, the charged pigment particles are white. In one embodiment, both the solvent or solvent mixture and the background layer are black, or red, or green, or blue. In one embodiment, the color of the background layer is more intense than the color of the solvent or solvent mixture. In one embodiment, the background layer is above the second layer, or underneath the second layer, or the second layer and the background layer are the same layer. In one embodiment, the second layer further comprises at least one non-collecting pixel electrode which is not electrically connected to any of the collecting pixel electrodes.

The second aspect of the invention is directed to an electrophoretic display, which comprises
(a) a first layer comprising a common electrode;
(b) a second layer comprising at least one collecting pixel electrode;
(c) a plurality of display cells which are sandwiched between the first layer and the second layer and are filled with an electrophoretic fluid comprising two types of charged pigment particles of two contrasting colors and oppositely charged, dispersed in a solvent or solvent mixture; and
(d) a background layer which has the same color as the darker color of the two contrasting colors.

In this second aspect of the invention, in one embodiment, the second layer has one collecting pixel electrode. In one embodiment, the second layer has more than one collecting pixel electrode and they are electrically connected. In one embodiment, the percentage of the total pixel electrode area in the area of the second layer is less than about 95%, preferably less than about 75%, more preferably less than about 50% and most preferably less than about 30%. In one embodiment, the two types of charged pigment particles are white and black dispersed in a clear and colorless solvent or solvent mixture. In one embodiment, the color of the background layer is more intense than the darker color of the two contrasting colors. In one embodiment, the background layer is above the second layer, or underneath the second layer, or the second layer and the background layer are the same layer. In one embodiment, the second layer further comprises at least one non-collecting pixel electrode which is not electrically connected to any of the collecting pixel electrodes.

The invention provides an electrophoretic display having the dark color state darker while maintaining the same intensity of the lighter color state, thus improving the contrast ratio of the images displayed.

BRIEF DESCRIPTION OF THE DRAWINGS

FIGS. 3a and 3b illustrate the operation of an electrophoretic display of the present invention.

FIGS. 6a and 6b illustrate the operation of the alternative design.

DETAILED DESCRIPTION OF THE INVENTION

Figure 1:
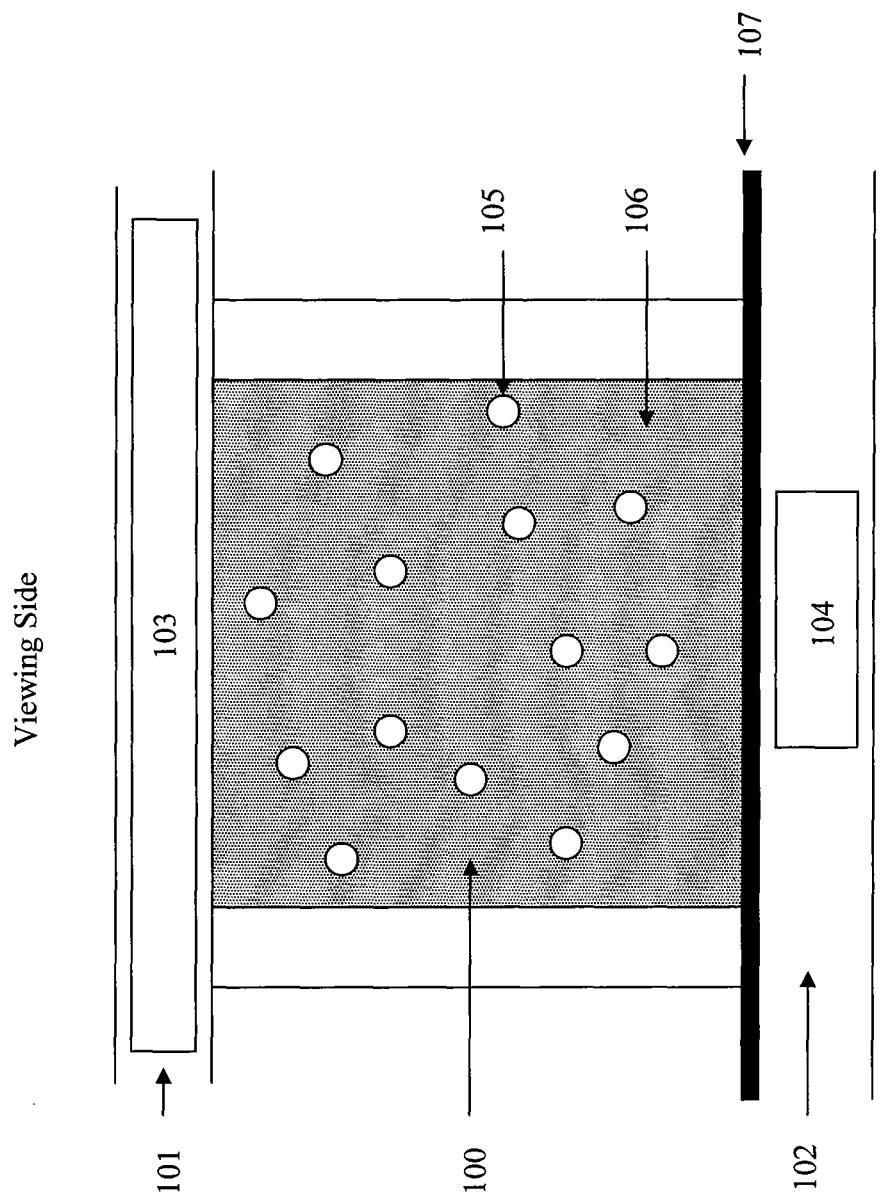
FIG. 1 depicts the configuration of an electrophoretic display of the present invention.

FIG. 1 depicts a cross-section view of a display cell of an electrophoretic display of the present invention. The display cell (100) is sandwiched between a first layer (101) and a second layer (102). The first layer comprises a common electrode (103). The second layer (102) comprises pixel electrode(s) (104).

The display cell is filled with an electrophoretic fluid comprising charged pigment particles (105) dispersed in a solvent or solvent mixture (106).

There may be only one type of the charged pigment particles in the fluid and they are either positively charged or negative charged.

It is also possible to have two types of charged pigment particles in the fluid. The two types of the particles are of two contrasting colors and oppositely charged.

In a first embodiment, the second layer comprises at least one pixel electrode (104). It is also possible to have more than one pixel electrode on the second layer.

The pixel electrode(s) may also be known as "collecting" pixel electrode(s). The function of the collecting pixel electrode(s) is to attract the charged pigment particles and have the charged pigment particles packed at these pixel electrode (s).

Figure 2A:
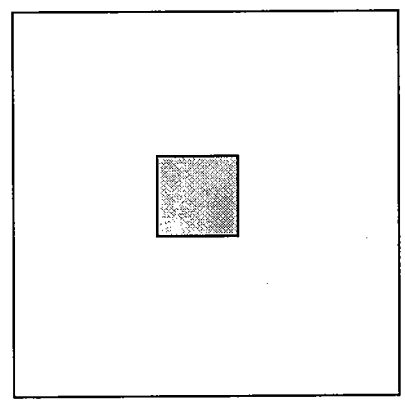
FIGS. 2a-2e illustrate a top view of various configurations of the pixel electrode(s) on the second layer
Figure 2B:
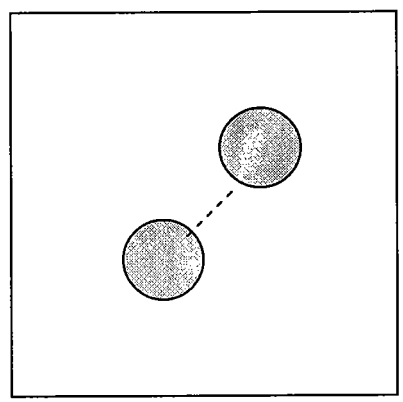
Figure 2C:
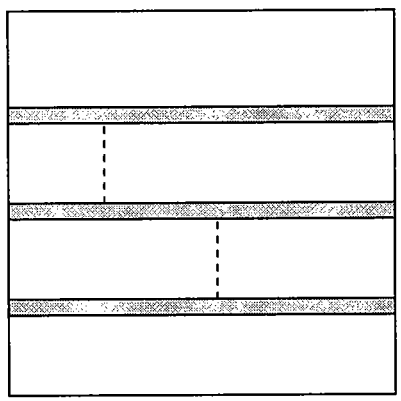
Figure 2D:
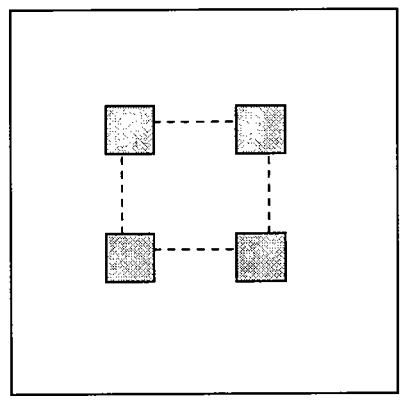
Figure 2E:
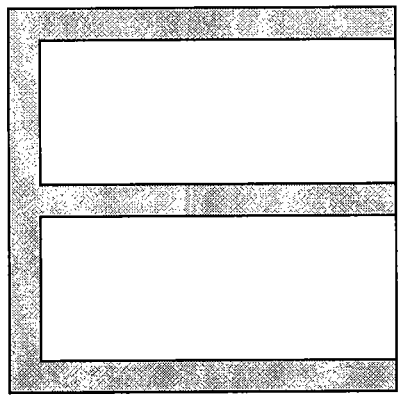

FIGS. 2a-2e show a top view of the second layer. In FIG. 2a, the second layer has only one square pixel electrode in the center of the second layer. In FIG. 2b, there are two pixel electrodes of a round shape. In FIG. 2c, there are three striped pixel electrodes. In FIG. 2d, there are four pixel electrodes. In FIG. 2e, there is one irregular shaped pixel electrode. The pixel electrodes within a display cell, if more than one, are electrically connected (indicated by dotted lines). In other words, the pixel electrodes in the same display cell will have the same voltage potential.

It is understood that the shape of the collecting pixel electrode(s) on the second layer may vary. They may be square, round, triangular or another shape, as long as they serve the desired functions. It is also possible for the pixel electrode(s) to have different shapes on the same second layer. In one embodiment, the pixel electrode(s) may be of an irregular shape.

The number of the pixel electrode(s) on a second layer may also vary. There may be one, two, three, four or more. However the total area occupied by the pixel electrodes should be less than the area of the second layer. The percentage of the total pixel electrode area in the area of the second layer is less than about 95%, preferably less than about 75%, more preferably less than about 50% and most preferably less than about 30%.

There is also a background layer (107) at the bottom of the display cell. The background layer may be above the second layer (as shown) or underneath the second layer (if the second layer is transparent). It is also possible that the second layer itself serves as the background layer.

In one embodiment, it is an essential feature that the color of the display fluid (i.e., the color of the solvent or solvent mixture in which the charged pigment particles are dispersed) is the same as the background layer. The color intensities of the solvent or solvent mixture and the background layer may be different. In most cases, the color of the background layer is more intense than the color of the solvent or solvent mixture.

The display cells may be of a conventional walled or partition type, a microencapsulated type or a microcup type. In the microcup type, the electrophoretic display cells may be sealed with a sealing layer. There may also be an adhesive layer between the electrophoretic display cells and the common electrode. The term "display cell" therefore is intended to refer to a micro-container which is individually filled with a display fluid. Examples of "display cell" include, but are not limited to, microcups, microcapsules, micro-channels, other partition-typed display cells and equivalents thereof.

FIGS. 3a and 3b illustrate how an electrophoretic display of the present invention is operated.

It is assumed that, in this example, that the charged pigment particles (305) are of the white color and positively charged. The solvent (306) in which the particles are dispersed is of the black color. The background layer (307) is also black. For illustration purpose, there is only one collecting pixel electrode (304) on the second layer.

In FIG. 3a, proper voltages are applied to the common electrode (303) and the pixel electrode (304) to cause the white pigment particles to migrate to be near or at the common electrode (303), thus a white color is being seen at the viewing side. The intensity of the white state exhibited in this case is substantially the same as that exhibited in a conventional electrophoretic display discussed above.

In FIG. 3b, proper voltages are applied to the common electrode (303) and the pixel electrode (304) to cause the white pigment particles to migrate to be near or at the pixel electrode (304), thus a black color is being seen at the viewing side. In this case, the incoming light, in the area not covered by the pixel electrode (304), would strike the black solvent (306) first and then the black background layer (307), which leads to a higher intensity of the black color. At the same time, the white pigment particles are gathered and packed at the pixel electrode (304) area. The area of the pixel electrode (304) may be slightly less dark; but it is still reasonably dark since the incoming light reflected back by the white pigment particles is limited. Therefore, the overall darkness at the dark color state is significantly enhanced, leading to an improved contrast ratio, compared to a conventional electrophoretic display with a uniformed electrode layer at the bottom in a display cell.

It is noted that, in this embodiment, the charged pigment particles may be of any colors, but the white color is most preferred. The color of the solvent and the background layer may be other than black (e.g., red, blue or green, etc.)

Figure 4B:
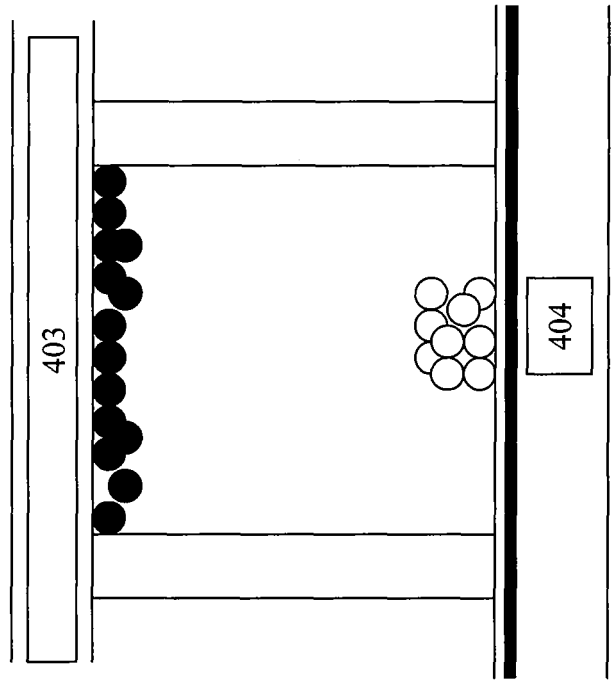
FIGS. 4a and 4b illustrate the operation of a two-particle system of an electrophoretic display of the present invention.
Figure 4A:
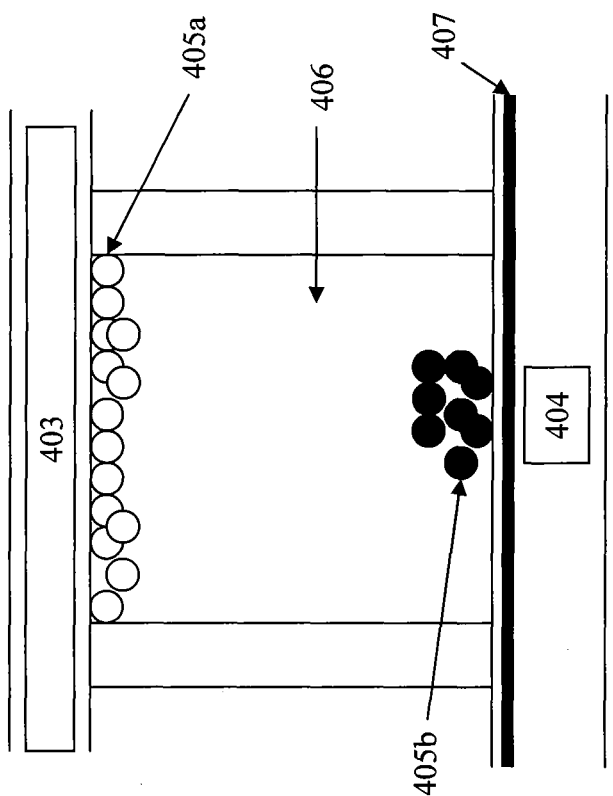

FIGS. 4a and 4b illustrate how an alternative electrophoretic display of the present invention is operated.

It is assumed that, in this example, that there are two types of charged pigment particles (405a and 405b) which are oppositely charged. One type of the charged pigment particles is white and the other type of the charged pigment particles is black. The solvent (406) in which the particles are dispersed is clear and colorless. The background layer (407) is black.

In FIG. 4a, proper voltages are applied to the common electrode (403) and the pixel electrode (404) to cause the white pigment particles to migrate to be near or at the common electrode (403) and the black pigment particles to migrate to the pixel electrode (404), thus a white color is being seen at the viewing side. The intensity of the white state exhibited in this case is substantially the same as that exhibited in a conventional electrophoretic display with a two particle system.

In FIG. 4b, proper voltages are applied to the common electrode (403) and the pixel electrode (404) to cause the white pigment particles to migrate to be near or at the pixel electrode (404) and the black particles to migrate to be near or at the common electrode (403), thus a black color is being seen at the viewing side. In this case, the incoming light would strike the black particles (405b) first and the light not absorbed by the black particles would then strike the black background layer (407), which leads to a higher intensity of the black color. At the same time, the white pigment particles are gathered and packed at the pixel electrode (404) area. The area of the pixel electrode (404) may be slightly less dark; but it is still reasonably dark since the incoming light reflected back by the white pigment particles is limited. Therefore, the overall darkness at the dark color state is enhanced, leading to an improved contrast ratio.

It is essential, in this embodiment, that the color of the background layer is the same as the color of the dark pigment particles. The two types of charged pigment particles may be of any two contrasting colors, but the white/black color combination is the most preferred. The color of the solvent is preferably colorless and clear.

Figure 5:
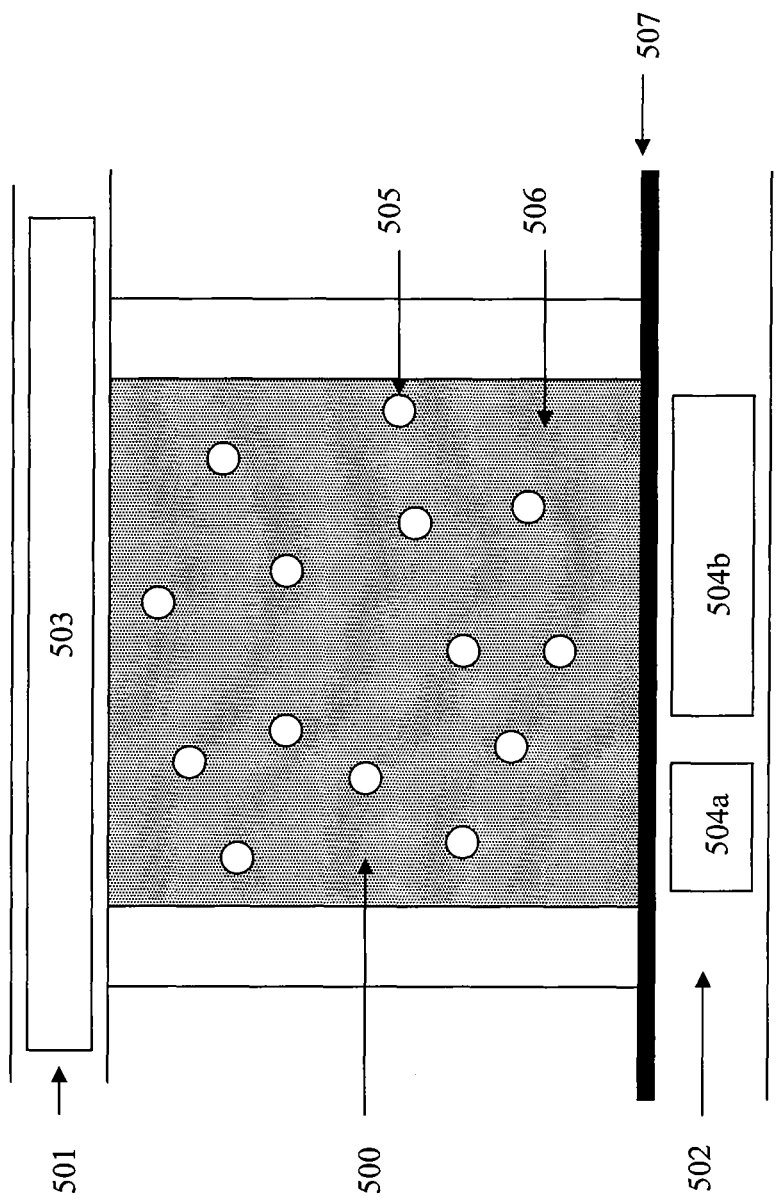
FIG. 5 is an alternative design of the present invention.

In a second embodiment, the second layer, on the area not occupied by the collecting pixel electrodes, there may be one or more non-collecting pixel electrodes as shown in FIG. 5.

The display cell (500) is sandwiched between a first layer (501) and a second layer (502). The first layer comprises a common electrode (503). The second layer comprises a collecting pixel electrode (504a) and a non-collecting pixel electrode (504b). As the collecting pixel electrode, it is also possible to have more than one non-collecting pixel electrode on the second layer. However, a pair of pixel electrodes, one collecting and one non-collecting, is preferred.

While the collecting electrodes are electrically connected within a display cell, there is no electrical connection between a non-collecting pixel electrode and any of the collecting pixel electrode(s).

For a pair of collecting and non-collecting pixel electrodes, the two pixel electrodes may be of the same size. It is also possible that one pixel electrode is larger than the other pixel electrode, as shown in FIG. 5. In the latter case, the larger pixel electrode may be the collecting pixel electrode (i.e., where the pigment particles gather). However it is preferred that the collecting pixel electrode is the smaller pixel electrode.

Similar to the first embodiment, the display cell is filled with an electrophoretic fluid comprising charged pigment particles (505) dispersed in a solvent or solvent mixture (506). The fluid may be a one particle system or a two particle system.

The background layer (507) may be above the second layer (as shown) or underneath the second layer (if the second layer is transparent). It is also possible that the second layer itself serves as the background layer.

It is also an essential feature of this second embodiment that the color of the background layer is either the same as the color of the solvent or solvent mixture (in a one particle system as shown in FIGS. 3a and 3b) or the same as the darker color of two contrasting colors (in a two particle system as shown in FIGS. 4a and 4b).

The function of the non-collecting electrode(s) is to ensure that charged pigment particles, when pushed towards the second layer, would gather at the collecting electrode(s). This is shown in FIGS. 6a and 6b.

In this example, it is assumed that the charged pigment particles (605) are of the white color and positively charged. The solvent (606) in which the particles are dispersed is of the black color. The background layer (607) is also black.

In FIG. 6a, when a lower voltage is applied to the common electrode (603) and a higher voltage is applied to one or both pixel electrodes, the positively charged white pigment particles would migrate to be near or at the common electrode (603), thus a white color is being seen at the viewing side.

In FIG. 6b, when a higher voltage is applied to the common electrode (603) and a lower voltage is applied to the pixel electrode (604a), the positively charged white pigment particles would migrate to be near or at pixel electrode (604a), thus a black color is being seen at the viewing side. However in order to avoid the charged pigment particles being scattered at the bottom of the display cell, a voltage higher than that applied to the collecting pixel electrode (604a) may be applied to the non-collecting pixel electrode (604b) to ensure that the charge pigment particles would all gather at the collecting pixel electrode (604a).

The same approach as illustrated may similarly be applied to a two particle system, such as that of FIGS. 4a and 4b.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display comprising
   a) a first layer and a second layer, wherein the first layer is on the viewing side and comprises only one electrode which is a common electrode, the second layer comprises a plurality of pixel electrodes, and the total area of all the pixel electrodes is less than 30% of the area of the second layer;
   b) a plurality of display cells which are filled with an electrophoretic fluid and sandwiched between the first layer and the second layer, which fluid comprises charged pigment particles dispersed in a solvent or solvent mixture; and
   c) a background layer which has the same color as the solvent or solvent mixture and the color of the background layer is more intense than the color of the solvent or solvent mixture;
   wherein said display is capable of displaying the color of the charged pigment particles and the color of the solvent or solvent mixture seen at the viewing side, and the color of the solvent or solvent mixture is enhanced by the background layer.

2. The display of claim 1, wherein the second layer has pixel electrodes which are electrically connected.

3. The display of claim 1, wherein the charged pigment particles are white.

4. The display of claim 3, wherein both the solvent or solvent mixture and the background layer are black.

5. The display play of claim 3, wherein both the solvent or solvent mixture and the background layer are red, green, or blue.

6. An electrophoretic display comprising
   a) a first layer and a second layer, wherein the first layer is on the viewing side and comprises only one electrode which is a common electrode, the second layer comprises a plurality of pixel electrodes, and the total area of all the pixel electrodes is less than 30% of the area of the second layer;
   b) a plurality of display cells which are filled with an electrophoretic fluid and sandwiched between the first layer and the second layer, which fluid comprises two types of charged pigment particles of two contrasting colors and oppositely charged, dispersed in a solvent or solvent mixture; and
   c) a background layer which has the same color as the darker color of the two contrasting colors and the color of the background layer is more intense than the darker color of the two contrasting colors;
   wherein said display is capable of displaying the two contrasting colors seen at the viewing side, and the darker color is enhanced by the background layer.

7. The display of claim 6, wherein the second layer has pixel electrodes which are electrically connected.

8. The display of claim 6, wherein the two types of charged pigment particles are white and black dispersed in a clear and colorless solvent or solvent mixture.

* * * * *